United States Patent [19]

Tone et al.

[11] 4,304,141
[45] Dec. 8, 1981

[54] TRACTOR POWER TAKE-OFF SYSTEM

[75] Inventors: Masatsugu Tone, Hashimoto; Yasuhisa Matsushita, Sakai, both of Japan

[73] Assignee: Kubota, Ltd., Japan

[21] Appl. No.: 140,222

[22] Filed: Apr. 14, 1980

[30] Foreign Application Priority Data

Jul. 2, 1979 [JP] Japan ............... 54/91734[U]

[51] Int. Cl.³ ............... F16H 37/06; B60K 17/28
[52] U.S. Cl. ............... 74/15.2; 56/DIG. 22; 74/15.66; 74/606 R; 172/125; 180/53 R; 180/53 C
[58] Field of Search ............... 74/11, 15.2, 15.66, 74/16, 665 F, 665 G, 665 GA, 606 R, 339; 192/48.91, 48.9, 48.8; 180/53 R, 53 C, 53 D, 233; 172/125, 74; 56/DIG. 22

[56] References Cited

U.S. PATENT DOCUMENTS

| | | | |
|---|---|---|---|
| 2,034,778 | 3/1936 | Storey | 74/15.2 X |
| 3,173,302 | 3/1965 | Robinson | 74/665 GA X |
| 3,266,590 | 8/1966 | Hungerford | 180/53 R X |
| 3,753,376 | 8/1973 | Ribeiro | 74/15.2 X |
| 3,763,949 | 10/1973 | Freiburger | 74/15.2 X |
| 3,922,931 | 12/1975 | Osujyo et al. | 74/15.2 X |
| 4,186,618 | 2/1980 | Richards | 74/339 |
| 4,187,924 | 2/1980 | Deschamps | 74/11 X |
| 4,257,284 | 3/1981 | Ashauer et al. | 74/339 |
| 4,262,768 | 4/1981 | Itatani et al. | 180/53 R X |

FOREIGN PATENT DOCUMENTS

| | | | |
|---|---|---|---|
| 1101679 | 10/1955 | France | 74/15.66 |
| 575858 | 4/1958 | Italy | 74/11 |
| 912109 | 12/1962 | United Kingdom | 74/15.2 |

*Primary Examiner*—C. J. Husar
*Assistant Examiner*—Moshe I. Cohen
*Attorney, Agent, or Firm*—Kane, Dalsimer, Kane, Sullivan and Kurucz

[57] ABSTRACT

In a tractor power take-off system in which first and second PTO shafts are disposed in the transmission case, the transmission case has at the bottom wall thereof an opening for taking off power to the second PTO shaft and there is disposed a PTO gear speed-change mechanism commonly used for both the first and second PTO shafts. The PTO gear speed-change mechanism has a PTO speed-change shift gear meshed all the times with a large-width speed-change gear for transmitting power to the second PTO shaft.

5 Claims, 4 Drawing Figures

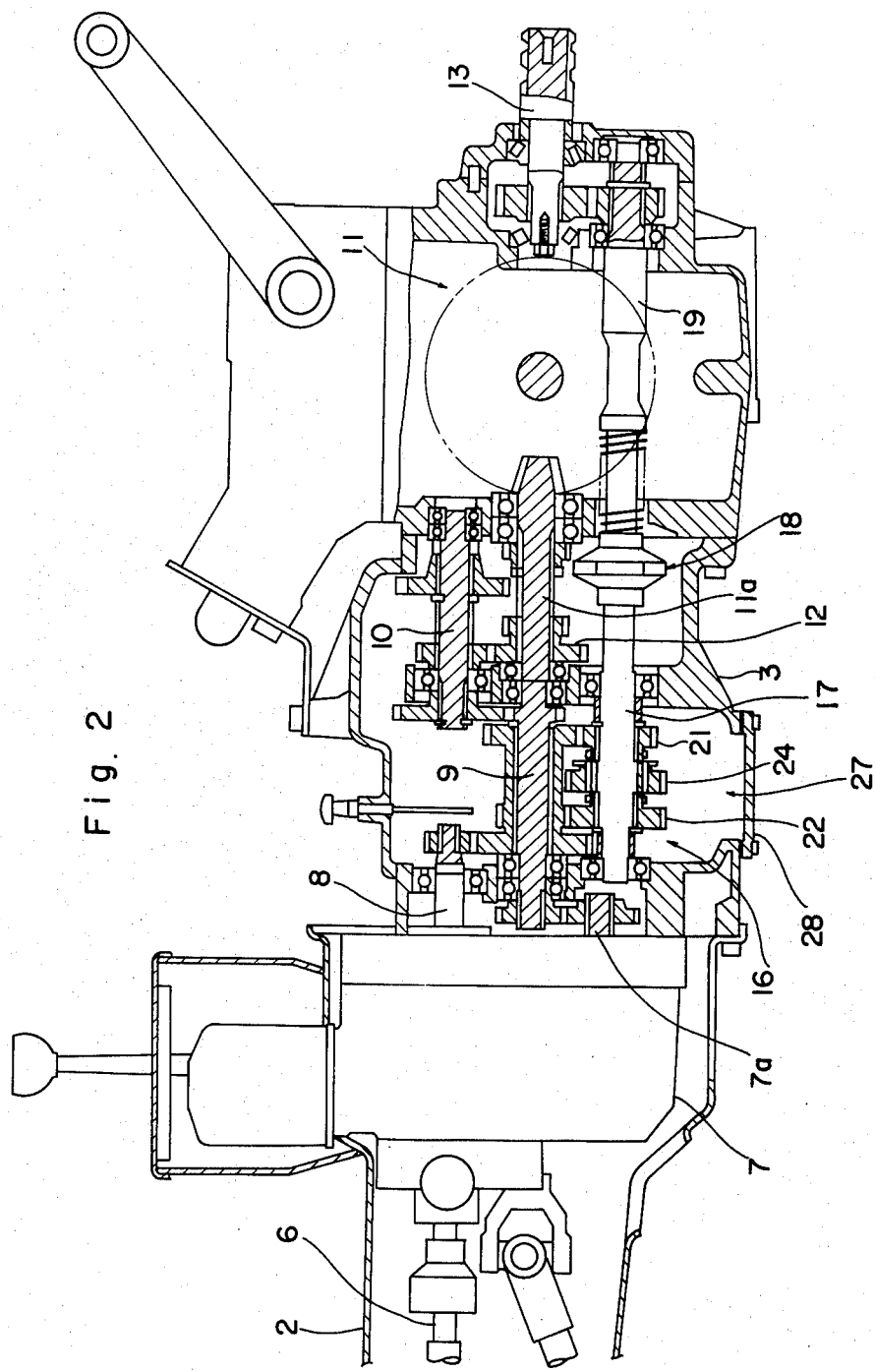

4,304,141

TRACTOR POWER TAKE-OFF SYSTEM

BACKGROUND OF THE INVENTION (1) Field of the Invention

The present invention relates to a tractor power take-off system in which the PTO shaft is projected from the rear end of the transmission case having therein a PTO gear speed-change mechanism for changing the number of rotations of the PTO shaft.

(2) Prior Art of the Invention

A conventional tractor has been constructed such that a working machine is attached to the rear end thereof and is driven, through the PTO gear speed-change mechanism, by the PTO (power take-off) shaft projected from the rear end of the transmission case.

There have recently been proposed improvements in such a conventional tractor in which another PTO shaft is disposed so as to drive a so-called "mid-mount" working machine, for example a mower, attached to the center position of a tractor.

However, it disadvantageously increases the manufacturing cost to manufacture, in different processes, a transmission case for a tractor to which a mid-mount working machine above-mentioned is attached, and a transmission case for a tractor to which such mid-mount working machine is not attached. It is rather desired to use common parts as much as possible for either type tractor.

On the other hand, when driving a mid-mount working machine above-mentioned, such working machine is required to be driven with its speed changed according to its machine kind or working conditions. Provision of another PTO gear speed-change mechanism required for such speed-change will further increase the manufacturing cost of a tractor.

As one of the measures to overcome such a defect as disposing another PTO gear speed-change mechanism, it may be proposed to commonly use one PTO gear speed-change mechanism for both the first and second PTO shafts.

According to such structure, when performing a speed-change operation, the speed-change gear of the PTO gear speed-change mechanism should be shifted to simultaneously engage with a gear at the driving shaft side and a gear of the first or second PTO shaft. However, such engagement may not be performed in a satisfactory manner.

In view of the foregoing, there has been desired a tractor power take-off system in which a speed-changeable first PTO shaft and a speed-changeable second PTO shaft may be disposed without considerable modification of a conventional transmission structure, and speed-change operation of such first and second PTO shafts may smoothly be performed.

SUMMARY OF THE INVENTION

It is an object of the present invention to remedy deficiency of prior art above-mentioned and to provide a tractor power take-off system provided with two speed-changeable PTO shafts.

A tractor power take-off system in accordance with the present invention comprises a transmission case having in the bottom wall thereof an opening, a first PTO shaft disposed at the rear end of the transmission case, first PTO intermediate shaft means disposed at the lower portion of the transmission case to transmit power to the first PTO shaft, a PTO gear speed-change mechanism to change the speed of output from a prime mover to transmit thus changed output to the first PTO intermediate shaft means, said PTO speed-change mechanism having a PTO speed-change shift gear disposed on the first PTO intermediate shaft means, a lower PTO transmission case attached to the opening, a second PTO shaft disposed at the lower PTO transmission case, and a large-width speed-change gear meshed with the PTO speed-change shift gear and disposed at the lower transmission case so as to transmit power to the second PTO shaft from the PTO speed-change shift gear.

According to the present invention, the PTO gear speed-change mechanism disposed for the first PTO shaft may also serve as a speed-change mechanism for the second PTO shaft, from the fact that an opening is formed in the bottom wall of the transmission case and a large-width speed-change gear for transmitting power to the second PTO shaft is meshed with the PTO speed-change gear of the PTO gear speed-change mechanism.

Furthermore, according to the present invention, the provision of the large-width speed-change gear permits to maintain engagement of the large-width speed-change gear with the PTO speed-change shift gear at all times even if the PTO speed-change shift gear is shifted for performing a speed-change operation. This presents an advantage that shifting of gear engagement in the PTO gear speed-change mechanism may smoothly be performed.

Other objects and advantages of the present invention will be apparent from the following description.

BRIEF DESCRIPTION OF THE DRAWINGS

The invention will be described by way of example, with reference to the accompanying drawings, in which:

FIG. 2 is a longitudinal section view in a side elevation of a transmission structure in the transmission case of the tractor in FIG. 1;

DETAILED DESCRIPTION OF THE PREFERRED EMBODIMENTS

Figure 1:
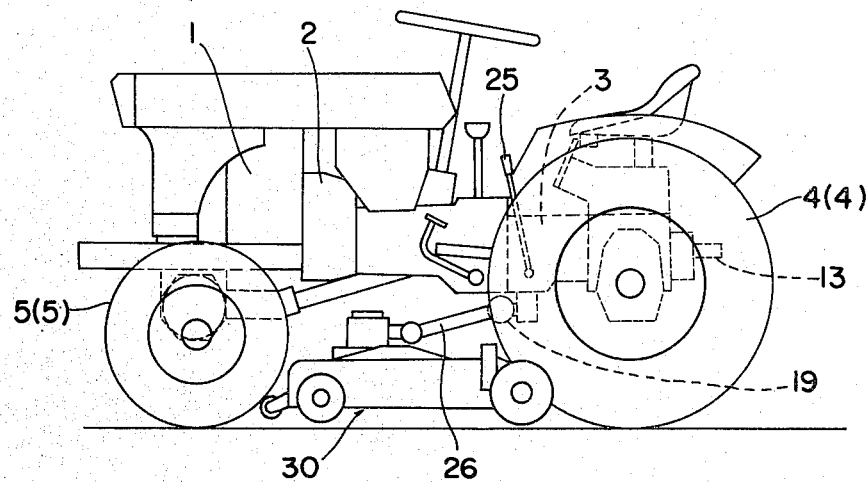
FIG. 1 is a side view of an agricultural tractor incorporating a power take-off system in accordance with the present invention.

In FIG. 1 schematically illustrating an agricultural tractor in a side elevation, an engine 1, a clutch housing 2 attached directly to the end of the engine 1 and a transmission case 3 attached directly to the end of the clutch housing 2 are disposed as a vehicle frame which is long in a front-rear direction. A pair of rear wheels 4 are supported by the lateral sides of the transmission case 3. A pair of front wheels 5 are supported by the lower lateral sides of the engine 1.

FIG. 2 illustrates the transmission structure in the clutch housing 2 and the transmission case 3. This transmission structure comprises an output shaft 6 to transmit output from the engine 1 through travelling clutch means (not shown), a hydraulic-type stepless speed-change means 7 for the travelling system to steplessly change the speed of output from the output shaft 6, a travelling-system output shaft 7a of the speed-change means 7, a PTO-system output shaft 8 to be directly connected to and driven by the output shaft 6, a travelling-system first transmission shaft 9 interlockingly connected to the travelling-system output shaft 7a by gears, a travelling-system second transmission shaft 10 interlockingly connected to the travelling-system first transmission shaft 9 by gears, travelling-system auxiliary speed-change means adapted to perform a high/low 2-stage speed-change operation by a sliding gear 12 splined to a drive pinion shaft 11a of a differential gear mechanism 11 for the rear wheels, a PTO gear speed-change mechanism 16 to change the rotation speeds of a first PTO shaft 13 projected from the rear wall of the transmission case and a second PTO shaft 15 supported by a lower transmission case 14 (FIG. 3) removably attached to an opening 27 in the transmission case bottom wall, a PTO-system first transmission shaft 17 for rearwardly transmitting output from the PTO gear speed-change mechanism 16, and a PTO-system second transmission shaft 19 adapted to be connected to the first transmission shaft 17 through one-way clutch means 18 and interlockingly connected to the first PTO shaft 13 by gears. These first and second transmission shafts 17 and 19 constitute first PTO intermediate shaft means.

Figure 3:
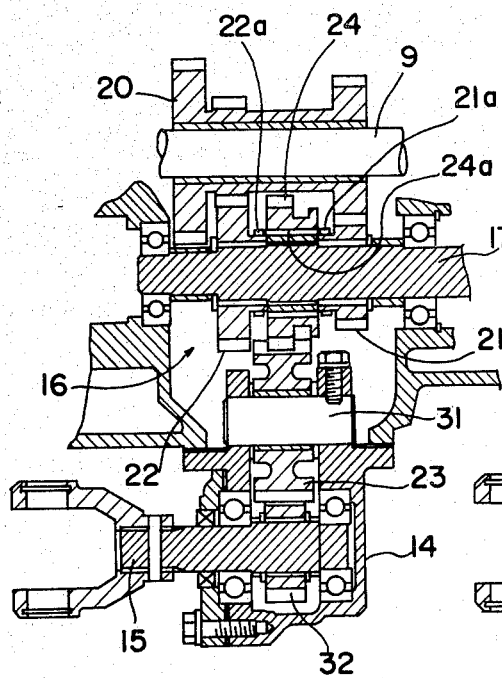
FIG. 3 is a longitudinal section view in a side elevation of the transmission structure with a lower transmission case attached thereto.

As shown in FIGS. 2 and 3, the PTO gear speed-change mechanism 16 comprises a three-stage gear 20 interlockingly connected to the PTO-system output shaft 8 by gears and rotatably supported by the travelling-system first transmission shaft 9, high-speed and low-speed driving gears 21 and 22 supported by the PTO-system first transmission shaft 17 in a manner rotatable around the axis thereof and meshed with the three-stage gear 20 all the times, and a PTO speed-change shift gear 24 splined to the PTO-system first transmission shaft 17 in a manner not-rotatable around the axis thereof but movable along the axis thereof, and meshed all the times with a large-width speed-change gear 23 which is adapted to transmit power to a second PTO shaft 15 and is rotatably supported by the lower transmission case 14. The driving gears 21 and 22 have at the bosses thereof external gear splines 21a and 22a engageable with the internal gear spline 24a of the PTO speed-change shift gear 24.

With such an arrangement, sliding of the PTO speed-change shift gear 24 to its three operational positions provides three statuses; that is, a first status where the PTO speed-change shift gear 24 is meshed with the high-speed driving gear 21, a second status where the PTO speed-change shift gear 24 is meshed with the low-speed driving gear 22, and a third status where the PTO speed-change shift gear 24 is meshed with neither of the driving gears 21 and 22. Selection of the first, second or third status above-mentioned may cause the first PTO shaft 13 and the second PTO shaft 15 to be rotated at a high speed or a low speed, or to be stopped rotating.

The PTO gear speed-change mechanism 16 is to be operated by a PTO speed-change lever 25 swingingly pivoted by the lateral side of the transmission case 3.

It is to be noted that FIG. 1 illustrates a mower 30 as a working machine to which output from the second PTO shaft 15 is transmitted through a transmission shaft 26.

FIG. 2 illustrates the transmission structure with the lower transmission case 14 for the second PTO shaft 15 removed and with a lid 28, instead of the lower transmission case 14, attached to the power take-off opening 27 in the bottom wall of the transmission case 3.

In FIG. 3, a shaft 31 is fixed to the lower PTO transmission case 14 so as to rotatably support the large-width speed-change gear 23, and a gear 32 is fixed to the second PTO shaft 15 so as to mesh with the large-width speed-change gear 23.

Figure 4:
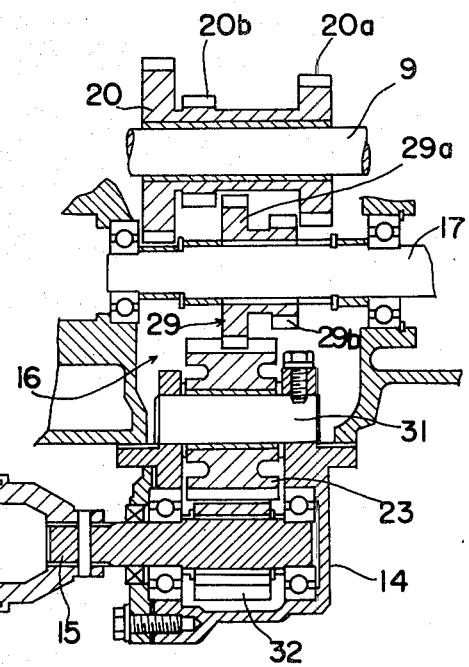
FIG. 4 is a longitudinal section view in a side elevation of another embodiment of the present invention.

FIG. 4 illustrates a second embodiment of the PTO gear speed-change mechanism 16 in accordance with the present invention.

In this embodiment of FIG. 4, output gears 20a and 20b of the three-stage gear 20 in the embodiment mentioned earlier are utilized as high-speed and low-speed driving gears, and the first transmission shaft 17 is splined to a two-stage gear 29 as a PTO speed-change shift gear, the two-stage gear 29 having teeth portions 29a and 29b each having a different diameter.

While in the first embodiment the teeth portion of the PTO speed-change shift gear 24 is meshed only with the tooth portion of the large-width speed-change gear 23, in the second embodiment one teeth portion 29a of the two-stage gear 29 is simultaneously meshed with the large-width speed-change gear 23 and the output gear 20b.

However, the PTO speed-change shift gears 24 and 29 in the first embodiment and the second embodiment, respectively, have an entirely same function in that any of these gears 24 and 29 is always meshed with the large-width speed-change gear 23 during the time a speed-change operation is being performed, and a high-/low/neutral speed-change operation may be performed by shifting the PTO speed-change shift gears 24 and 29.

In FIG. 4, a shaft 31 is fixed to the lower PTO transmission case 14 so as to rotatably support the large-width speed-change gear 23, and a gear 32 is fixed to the second PTO shaft 15 so as to mesh with the large-width speed-change gear 23.

We claim:

1. A tractor power take-off system comprising;
   a transmission case (3) having at the lower portion thereof an opening (27),
   a first PTO shaft (13) disposed at the rear end of said transmission case (3),
   first PTO intermediate shaft means disposed at the lower portion of said transmission case (3) so as to transmit power to said first PTO shaft (13),
   a PTO gear speed-change mechanism (16) to change the speed of output from a prime mover to transmit thus changed output to said first PTO intermediate shaft means, said mechanism (16) having a PTO speed-change shift gear (24, 29) disposed on said first PTO intermediate shaft means,
   a lower PTO transmission case (14) attached to said opening (27),
   a second PTO shaft (15) disposed at said lower PTO transmission case (14), and
   a large-width speed-change gear (23) meshed with said PTO speed-change shift gear (24, 29) to transmit power from said PTO speed-change shift gear (24, 29) to said second PTO shaft (15).

2. A system as set forth in claim 1, wherein the PTO speed-change shift gear (29) has two tooth portions (29a) (29b) each having a different diameter and is fittingly splined to the first PTO intermediate shaft means, one tooth portion (29a) of said tooth portions (29a) (29b) being meshed with the large-width speed-change gear (23) at all times.

3. A system as set forth in claim 2, further comprising a shaft (31) fixed to the lower PTO transmission case (14) so as to rotatably support the large-width speed-change gear (23), and a gear (32) fixed to the second PTO shaft (15) so as to mesh with the large-width speed-change gear (23).

4. A system as set forth in claim 1, wherein the PTO gear speed-change mechanism (16) has two driving gears (21) (22) each having a different diameter fixed to the first PTO intermediate shaft means, said gears (21) (22) having external gear splines (21a) (22a), respectively, and the PTO speed-change shift gear (24) is disposed at the first PTO intermediate shaft means and has an internal gear spline (24a) to be selectively meshed with one of said external gear splines (21a) (22a) of said driving gears (21) (22).

5. A system as set forth in claim 4, further comprising a shaft (31) fixed to the lower PTO transmission case (14) so as to rotatably support the large-width speed-change gear (23), and a gear (32) fixed to the second PTO shaft (15) so as to mesh with the large-width speed-change gear (23).

* * * * *